United States Patent
Ferencz et al.

(10) Patent No.: US 10,186,949 B1
(45) Date of Patent: Jan. 22, 2019

(54) COUPLED-INDUCTOR DC-DC POWER CONVERTER

(71) Applicant: International Business Machines Corporation, Armonk, NY (US)

(72) Inventors: Andrew Ferencz, Southborough, MA (US); Todd E. Takken, Brewster, NY (US); Xin Zhang, Yorktown Heights, NY (US); Yuan Yao, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/808,804

(22) Filed: Nov. 9, 2017

(51) Int. Cl.
*H02M 3/335* (2006.01)
*H02M 1/14* (2006.01)
*H02M 1/00* (2006.01)

(52) U.S. Cl.
CPC .......... *H02M 1/14* (2013.01); *H02M 3/33576* (2013.01); *H02M 2001/0064* (2013.01)

(58) Field of Classification Search
CPC ............ G05F 1/253; G05F 1/325; G05F 1/33; H02M 2001/0064; H02M 3/335;
(Continued)

(56) References Cited

U.S. PATENT DOCUMENTS 3,553,620 A   1/1971  Cielo et al.
4,774,649 A   9/1988  Archer
(Continued)

FOREIGN PATENT DOCUMENTS

EP   1659678 A2   5/2006

OTHER PUBLICATIONS

"25 Watt DC/DC converter using integrated Planar Magnetics", Philips Components, technical note, Philips Magnetic Products, http://www.elnamagnetics.com/wp-content/uploads/library/Ferroxcube-Documents/25_Watt_DC-DC_converter_Using_Integrated_Planar_Magnetics.pdf, Date of Release: Mar. 1996, pp. 1-15.

*Primary Examiner* — Gary L Laxton
(74) *Attorney, Agent, or Firm* — Scully, Scott, Murphy & Presser, P.C.; Daniel Morrris, Esq.

(57) ABSTRACT

A DC-to-DC power converter device has a common magnetic core structure that serves the functions of both transformer device and output inductor by integrating each into the common core. The transformer device has primary and secondary windings integrated into a first leg structure of the magnetic core, and the output inductor device has an output inductor winding integrated into a second leg structure of the magnetic core, the inductor winding structure for delivering output current to a load when a periodically switched input voltage is applied across the primary winding structure. The winding polarities of the transformer secondary winding structure and of the output inductor winding structure provide oppositely oriented polarities of electromotive force (EMF) to substantially reduce an output current ripple to an output load when delivering power through the transformer, through the output inductor and into the output load. A third leg structure of the common magnetic core allows magnetic flux passing through the transformer leg structure to partially magnetically couple to flux passing through the inductor leg structure, thereby allowing adjustment of the output voltage at which output current ripple is minimized.

20 Claims, 7 Drawing Sheets

(58) Field of Classification Search
CPC ......... H02M 3/33507; H02M 3/33523; H02M 3/33553; H02M 3/33569; H02M 3/33576; H02M 3/33592; H01F 27/42
See application file for complete search history.

(56) References Cited

U.S. PATENT DOCUMENTS

| | | | |
|---|---|---|---|
| 4,959,764 A | | 9/1990 | Bassett |
| 5,440,472 A | | 8/1995 | Sturgeon |
| 5,663,876 A | | 9/1997 | Newton et al. |
| 6,549,436 B1 | | 4/2003 | Sun |
| 6,677,847 B1 | * | 1/2004 | Ferencz ............. H01F 17/0006 29/602.1 |
| 7,289,329 B2 | | 10/2007 | Chen et al. |
| 7,427,910 B2 | | 9/2008 | Mehrotra et al. |
| 7,468,649 B2 | * | 12/2008 | Chandrasekaran ..... H01F 27/38 323/358 |
| 7,675,764 B2 | | 3/2010 | Chandrasekaran et al. |
| 8,094,458 B2 | | 1/2012 | Furnival |
| 8,223,509 B2 | * | 7/2012 | Won ........................ H01F 38/10 323/250 |
| 8,228,690 B2 | * | 7/2012 | Watanabe ................. H02J 1/10 307/43 |
| 8,704,500 B2 | * | 4/2014 | Xiao ................... H02M 3/1584 323/272 |
| 9,356,520 B2 | | 5/2016 | Njiende et al. |

\* cited by examiner

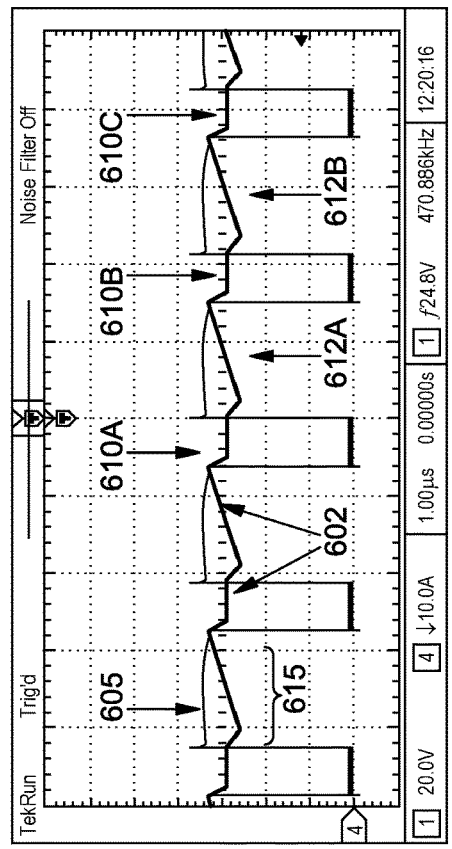
FIG. 6
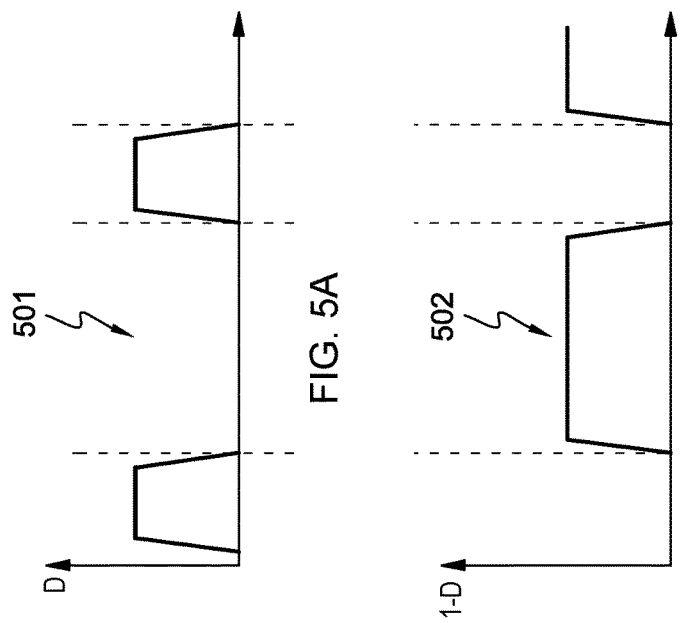
FIG. 5A
FIG. 5B

COUPLED-INDUCTOR DC-DC POWER CONVERTER

STATEMENT REGARDING FEDERALLY SPONSORED RESEARCH OR DEVELOPMENT

This invention was made with government support under Contract No. B621073 awarded by the U.S. Department of Energy. The government has certain rights to this invention.

FIELD

The present invention relates generally to DC-DC power converters, and an improved DC-DC power converter having reduced output current ripple and that avoids resonant energy storage.

BACKGROUND

Modern high-performance computer processors and ASICs require high current at low voltage. A typical processor today may require anywhere from a 0.7 V to 1.1 V core voltage with peak currents exceeding 200 A. A DC-DC regulator placed close the processor minimizes the distance that the high current must travel through the circuit board from the regulator source to the processor load. Several DC-DC converters may be used in parallel, in order to deliver a higher total load current. Typical currents per converter are from 40 A to 60 A. Systems commonly use from one to eight converters in parallel.

The ubiquitous means of delivering power to the DC-DC converters is to distribute a 12 V intermediate bus within the system drawer or rack. The high currents involved in distributing 12 V can present challenges for systems that have high power or which distribute the intermediate bus over longer distances throughout a rack. The conductors that carry the 12 V intermediate bus dissipate power as the current squared times the resistance of the conductors. As power rises or current increases the losses increase as the square of the load current. To lower resistance more copper cross-section is needed, resulting in heavier cables, more connector pins, and more layers of copper in a printed circuit board (PCB).

A well-known solution to distributing intermediate bus power raises the voltage to decrease the current. The industry has established through agency regulation that voltages less than 60 V are considered safe and do not require that special provisions be made to shield people from having access to these circuits. In the industry, a 48 V intermediate bus is a widely adopted solution for telecom hardware systems and for some other systems having rack-level distribution of the intermediate bus. In some systems, a converter transforms the 48 V DC intermediate bus to 12 V DC, so that the traditional 12 V to processor voltage DC-DC converters can still be used. Thus, the system's overall DC-DC power conversion from 48 V to processor voltage consists of multiple power conversion stages in series. Each power conversion stage takes up physical space and consumes power.

Another option that has been adopted by some of the industry is to directly convert from a 48 V DC intermediate voltage to the sub 1 V processor voltage in a single conversion step stage. Such designs both eliminate the power loss, volume, and material cost of the separate 48 V to 12 V conversion stage and reduce the intermediate bus distribution losses, due to the 4× reduction in intermediate bus current.

Further, common 12 V to sub 1 V DC-DC converters do not have transformers and use switches or diodes to directly connect from the 12 V intermediate bus to the output inductor for part of the converter's switching cycle. For higher voltage intermediate busses in the range of 48 V, however, it becomes difficult to directly connect the output switching devices to the intermediate bus. The "on time" of the 48 V to inductor switch is short, the duty cycle is small and switch timing is difficult to control. Hence, many vendors are now designing 48 V to sub 1 V DC-DC converters that include transformers and have the switching secondary-side Field Effect Transistors (FETs) connected between the secondary side of the transformer and the output inductor. The transformer-based industry DC-DC converter designs to date have separate transformers and inductors. The magnetic ferrite cores for these transformers and inductors take up significant physical volume and make transformer-based DC-DC converters less space- and cost-efficient.

SUMMARY

An embodiment of the present disclosure is directed to a DC-DC power converter having a transformer, wherein the relative timing of the switches on the primary and secondary sides of the transformer is defined so as to turn on both the primary main switches and the secondary main switches concurrently and to thereby avoid resonant energy storage. Avoiding resonant energy storage provides a space savings, since a given volume of magnetic material in the transformer core can pass more energy through the transformer per unit time, without the magnetic field density exceeding the saturation field density of the magnetic material.

In one embodiment, the DC-DC power converter improves the space efficiency and the electrical performance of a DC-DC converter, by combining the converter's transformer and inductor magnetic ferrite cores into a single structure and by correctly defining the transformer secondary and the inductor winding polarities, so that only a small inductance value is required and so that the magnetic core volume can then be made small. In this way sharing two magnetic functions in a common volume of magnetic material provides a space savings.

In one aspect, a magnetic circuit for a DC to DC power converter device comprises:

A magnetic circuit for a DC to DC power converter device comprising: a common magnetic core structure providing a transformer device having primary winding and secondary winding structures integrated into a first leg structure of the magnetic core, and an output inductor device having an output inductor winding structure integrated into a second leg structure of the magnetic core. The inductor winding structure is for delivering output current to a load when a periodically switched input voltage is applied across the primary winding structure. A secondary main switch device operatively connected to the secondary winding structure and timed to prevent a current reversal through the secondary winding structure. The secondary winding structure is of a first winding polarity and the output inductor winding structure is of a second winding polarity, the first and second winding polarities providing oppositely oriented polarities of electromotive force (EMF) to substantially reduce an output current ripple to an output load when delivering power through the transformer, through the output inductor and into the output load. The common magnetic core further includes a third leg structure allowing a magnetic flux created through the first leg structure to pass partially through the second leg structure and partially through the third leg structure, thereby providing a partially-coupled magnetic flux path between the transformer magnetic core leg structure and the second leg structure. The magnitude of this partial magnetic coupling determines the output voltage at which the output current ripple is minimized.

By optimally defining the level of magnetic coupling, the transformer turns ratio and the operational duty cycle, then the output current ripple through the inductor can be made very small at a designed optimal output voltage.

BRIEF DESCRIPTION OF THE DRAWINGS

FIG. 5A shows an example pulsed digital gate control signal of duty cycle "D" applied to the inputs of main primary and main secondary synchronous rectifier switches in the embodiment shown in FIG. 3A;

FIG. 5B shows an example pulsed digital gate control signal of the complementary duty cycle "1-D" for simultaneously controlling timed activation of the gates of the active clamp reset switch and secondary reset synchronous rectifier in the embodiment shown in FIG. 3A;

FIG. 6 is a timing diagram depicting an example operation of the DC-DC power converter circuit of FIGS. 1-3A showing coupled inductor output current plotted against the switched primary reset voltage across the primary transformer in an example implementation;

DETAILED DESCRIPTION

The present disclosure relates to a DC-DC power converter having increased space efficiency and improved electrical performance.

Figure 1:
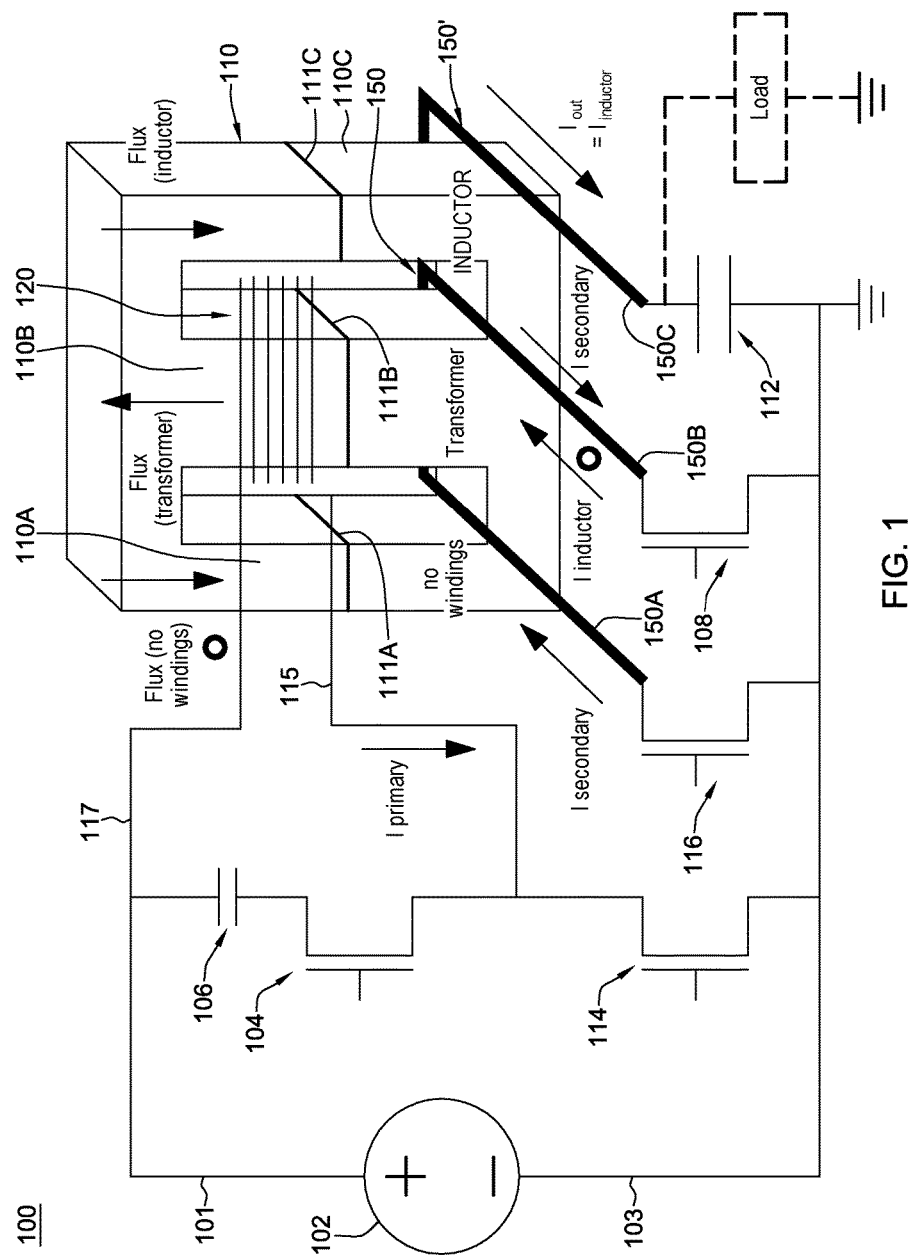
FIG. 1 shows one embodiment of a DC-DC power converter including a three-post magnetic core providing a partially coupled magnetic flux path between transformer and inductor posts; and including active clamp forward converter components and electrical circuits connected to these windings.

As shown in FIG. 1, a magnetic core, e.g., a ferrite core structure 110, has three core legs: a transformer leg, an inductor leg, and a no-winding leg. By combining the converter's transformer leg and inductor magnetic ferrite core leg into a single structure and by correctly defining the transformer secondary and inductor winding polarities, the value of inductance required is reduced. By defining the relative timing of the switches on the primary and secondary sides of the transformer so as to turn on both the primary main switches and the secondary main switches concurrently, resonant energy storage in the transformer core is avoided. For both of these reasons the volume of the unified magnetic core can be small, as now described in detail with accompanying figures. It is noted that like and corresponding elements described herein and illustrated in the drawings are referred to by like reference numerals.

The sharing of two magnetic functions in a common volume of magnetic material provides a first space savings. When the magnetically coupled transformer and inductor windings are configured with the correct polarity of the transformer secondary winding relative to the inductor winding, the relative polarities of the electromotive force (EMF) of the transformer and inductor counteract each other when the transformer is passing current, which reduces the ripple current in the converter's output inductor. This allows using a much smaller inductor value to achieve the same output current ripple. Reducing the designed inductance value allows for further reduction in the converter's size and volume.

The net reduction in volume allows this transformer-based DC-DC converter with a high input voltage to be competitive in space efficiency with traditional buck converters that have no transformer but can only operate from lower input voltages. In addition, the relative timing of the switches on the primary and secondary sides of the transformer is defined so that both primary and secondary switches are simultaneously on, resulting in no significant energy storage in the transformer ferrite, allowing a third space savings from a smaller ferrite volume.

The described DC-DC power converter provides performance benefits. As a result of the coupling of magnetic flux between the transformer and inductor, operation at one particular ratio of converter input to output voltage leads to having ideally zero ripple in the output current. The ripple may be nonzero but very low in a range of output voltages around an operating point. A lower converter output ripple current results in lower voltage noise seen by the processor load, for a given amount of load capacitance. Another benefit that results from the smaller inductor value is an improved (i.e., decreased) converter time response to load current transients or to changes in an output load.

The magnetic structure's volume and output inductor ripple current are minimized when the magnetic reluctances are optimized for a particular ratio of DC-DC converter input voltage to output voltage.

FIG. 1 shows one embodiment of a DC-DC power converter 100 embodied as a magnetic and electrical circuit including a three-post magnetic core providing a partially coupled magnetic flux path between transformer and inductor posts. The power converter 100 of FIG. 1 shows the magnetic core as having a transformer primary, a transformer secondary and inductor electrical windings; and further including active clamp forward converter components and electrical circuits connected to the windings. In particular, FIG. 1 shows a representation of a magnetic circuit with three legs including a coupled output inductor, plus external components comprising an active clamp forward converter with high side reset. The circuit is shown including a primary voltage source 102 providing a first power supply line 101 and connected to a second ground line 103. Connected to the power supply line 101 is one end of an active clamp reset capacitor 106, the other end being connected in series with a first terminal (e.g., drain or source) of a first MOSFET device 104 functioning as an active clamp reset switch. A second terminal (e.g., source or drain) of first MOSFET device 104 is connected to a first terminal of a second MOSFET device 114 functioning as the main primary switch. A second terminal of MOSFET 114 is connected to the ground line 103.

Each gate of respective first and second MOSFETs 104, 114 includes an electrical connection to receive pulsed signals from a variable duty cycle pulsed voltage source (not shown). Through timed activation, MOSFETS 104, 114 provide a flow of primary winding current I_PRIMARY.

The power converter includes a magnetic core 110 formed of a material with high magnetic permeability, for example a ferromagnetic material such as iron, nickel and cobalt and/or their alloys. Magnetic core 110 has three portions or legs 110A, 110B, 110C, each leg having a respective separating gap 111A, 111B, 111C creating a particular magnetic reluctance in the respective leg. Leg 110A is the magnetic core leg having no conductive winding, leg 110B is the transformer leg, and leg 110C is the inductor leg, with each leg having a defined magnetic reluctance. The ratio of reluctances of the no winding leg 110A and inductor leg 110C determines the how much of the magnetic flux through the transformer leg 110B flows through either leg 110A or 110C. The ratio of reluctances therefore determines the amount of magnetic coupling between the transformer and inductor. By adjusting these reluctances a directly coupled, partially-coupled or uncoupled magnetic flux path can be provided between the transformer post 110B and the inductor post 110C.

In one embodiment, the second leg portion 110B of magnetic core 110 functions as the transformer core having surfaces over which is wound a primary transformer winding 120 in the winding direction as shown. In one embodiment, the number of windings of primary winding 120 is designated as "Np." In one non-limiting example, there Np may equal 12 windings. The primary winding 120 includes one end 115 connected to the common connected terminals of the MOSFET devices 104, 114, and a second end 117 connected to the power line 101. As shown in FIG. 1, the primary winding is wound about a first portion of second leg 110B. Through primary winding 120 flows a primary winding current I_PRIMARY, which increases when voltage is applied during a first part of a timing cycle when transformer primary terminal 115 is connected to ground 103 through primary main MOSFET 114 which is turned on and activated during the first part, and which decreases during a second part of the cycle when transformer primary terminal 115 is connected to reset capacitor 106 through primary reset MOSFET 104 when it is turned on and activated during a second part of the timing cycle.

In one embodiment, another portion of the second leg 110B includes surfaces over which is wound a secondary transformer winding 150. In one embodiment, the number of windings of winding 150 is designated as "Ns." As shown in FIG. 1, the secondary winding 150 is a single wire having a first portion wound one turn (i.e., N=1) about the surfaces of a second portion of the secondary leg 110B. It is understood that, alternatively, N can be greater than 1. Conductive wire end 150A of secondary winding 150 functions as the current source into secondary winding 150 and is electrically connected to a terminal (source or drain) of a third MOSFET 116 functioning as a secondary side main switch. The third MOSFET 116 includes a second terminal connected to the ground line 103 and is adapted to carry secondary winding current I_SECONDARY.

Conductive wire end 150B of secondary winding 150 functions both as the current sink of transformer secondary winding 150 and as the current source for inductor winding 150'. Conductive wire end 150B is electrically connected to a terminal (source or drain) of a fourth MOSFET 108 functioning as a secondary side circulator switch. The fourth MOSFET 108 includes a second terminal connected to the ground line 103. In one non-limiting embodiment, as shown in FIG. 1, the secondary side components 116, 108, 112 and the load are connecting in a non-isolated fashion to the same ground 103 as the primary side components 102 and 114. In an alternate isolated embodiment, these secondary side components may be connected to a secondary ground which would be different than primary ground 103. In the isolated embodiment, the DC-DC converter would function in an equivalent fashion, although level shifting or isolation circuitry might be needed for the timing logic feeding the gates of the switching FETs 104, 114, 116 and 108.

Each gate terminal of respective MOSFETs 116, 108 are each electrically connected to receive pulsed signals from a variable duty cycle pulsed voltage source (not shown). Through timed activation, MOSFETS 116, 108 connect the inductor winding 150' to ground 103 either though the transformer secondary 150A when FET 116 is on, or directly to ground 103 when FET 108 is on. When energy is transferred through the transformer, i.e., when MOSFETs 116 and 114 are both simultaneously turned on, the inductor winding structure delivers output current to a load from the voltage source 102 through the transformer. During a reset circulator phase of the switching cycle during a second part of the switching cycle, when switches 114, 116 are off, switches 104 and 108 are simultaneously turned on, and signal switch 116 (or an equivalent diode) prevents current reversal in the secondary, i.e., through the secondary winding structure (i.e., the I_secondary current never flows backward) through switch 116. During this second reset circulator phase of the switching cycle, only the inductor delivers current to the output load; the voltage source 102 and the transformer are not involved, and current circulates through circulator switch 108, the inductor and the load.

In the power converter 100 of FIG. 1, the third leg 110C or inductor leg of the magnetic core forms a magnetically coupled output inductor having an inductor winding wound thereon. In one embodiment, the inductor winding is wound around leg 110C only one turn (N=1), but it is understood that alternatively, N can be greater than 1.

As further shown in FIG. 1, the single inductor winding 150' about inductor leg 110C of the magnetic core 110 includes extending conductive wire portions 150B, 150C.

Single wire conductive leg 150C of winding 150' includes a portion electrically connected to a first terminal of output capacitor 112 used for filtering the output current ripple and reducing the resulting dc voltage ripple across the load. The second terminal of the output capacitor 112 connects to ground.

Figure 2:
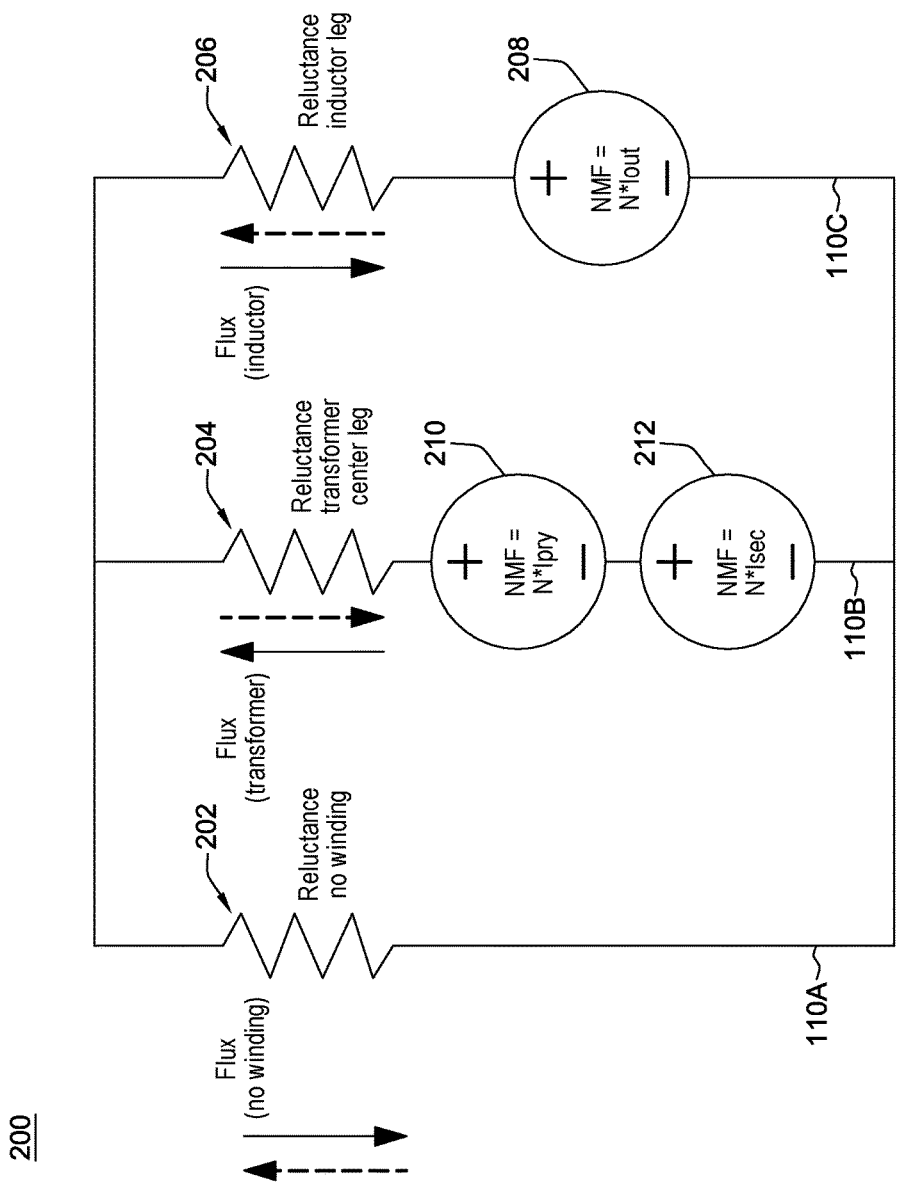
FIG. 2 shows a magnetic reluctance model of the magnetic core having three legs as depicted in the circuit embodiment of FIG. 1.

FIG. 2 shows a magnetic reluctance model 200 of the magnetic core 110 having three legs 110A, 110B and 110C as depicted in FIG. 1. The reluctance model 200 shown in FIG. 2 models the Magnetomotive Force (MMF) produced by each of the three windings, i.e., a primary winding MMF 210 through leg core portion 110B, a secondary winding MMF 212 through leg core portion 110B, and an inductor winding MMF 208 through leg core portion 110C. The MMF from each winding is directly proportional to the flux induced by the winding in the leg around which the winding passes. The reluctance model 200 shown in FIG. 2 also models the reluctance (providing a magnetic resistance value) 202 in the no winding magnetic core leg 110A, the reluctance 204 of transformer magnetic core leg 110B and the reluctance 206 of output inductor magnetic core leg 110C. The reluctances are a "resistance" to flux flow through each magnetic core leg and are determined primarily by the respective magnetic core air gaps 111A, 111B, 111C in respective ferrite core legs 110A, 110B, 110C and the cross sectional area of the ferrite in the plane of each gap. FIG. 2 therefore shows how the relative gaps of the no winding core leg 110A and of the inductor core leg 110C determine the relative reluctances of these legs and thereby determine how the flux from the transformer leg 110B will split between legs 110A and 110C. For a given flux in transformer leg 110B the reluctance ratio 206 vs. 202 determines what fraction of this transformer leg flux will flow in the inductor leg. As known, a changing magnetic flux in a ferrite core leg will create an ElectroMotive Force (EMF) in an electrical winding around that leg. The relationship (from the Faraday's law) is $d\Phi/dt=EMF/N$ where $\Phi$ is the magnetic flux and EMF appears as a voltage across the winding. The ratio of a change in flux through the transformer leg to the change in flux through the inductor leg will be proportional to a ratio of the voltage induced across the transformer secondary winding to the voltage that appears across the inductor winding. In this way, setting the core leg gaps will set the relative voltage induced across the transformer secondary winding to the voltage induced across the inductor winding.

In one embodiment, the output current, I_out, can have a dIout/dt of zero, i.e. no ripple current, if the relationship of the magnetic reluctance_inductor 206 of inductor leg 110C and reluctance_outer 202 of the outer leg 110A have a particular relationship to the duty-cycle. The design of particular reluctance in each leg and flux flow percentages and directions of flow is such to achieve a desired amount percentage of magnetic coupling between the transformer and inductor. The desired amount percentage of magnetic coupling between the transformer and inductor, i.e., based on the designed flux directions and flux magnitude throughout each leg, achieves the reduction of inductance, form factor, and noise.

More particularly, the ratio of the reluctances of the inductor leg 110C and 'no winding' leg 110A determines the percentage of transformer leg flux that flows in the inductor leg 110C and 'no winding' leg 110A. This ratio determines the relative voltages which the changing flux induces across the transformer secondary and inductor windings and thereby determines the net voltage applied across the inductor. The net voltage applied across the inductor determines how much the inductor current will change and therefore determines the ripple current in the output inductor. The arrows indicated in the reluctance model of the core shown in FIG. 2 can also indicate the direction of change of the magnetic flux relative to a voltage across the windings. For example, application of the Vin voltage across the primary winding during an activation of primary switch 114 at the main (first) part of the duty cycle causes the current through the transformer primary to increase and results in the change of magnetic flux as depicted by the solid arrows shown in FIG. 2. During a remaining reset or circulator portion of the cycle with secondary side circulator switch 108 activated and negative reset capacitor voltage applied across the primary winding, the opposite polarity of the net primary winding voltage causes the current through the transformer primary to decrease and results in an increase of magnetic flux in the direction as depicted by the broken arrows at each leg as shown in FIG. 2 (the EMF polarities change).

Figure 3A:
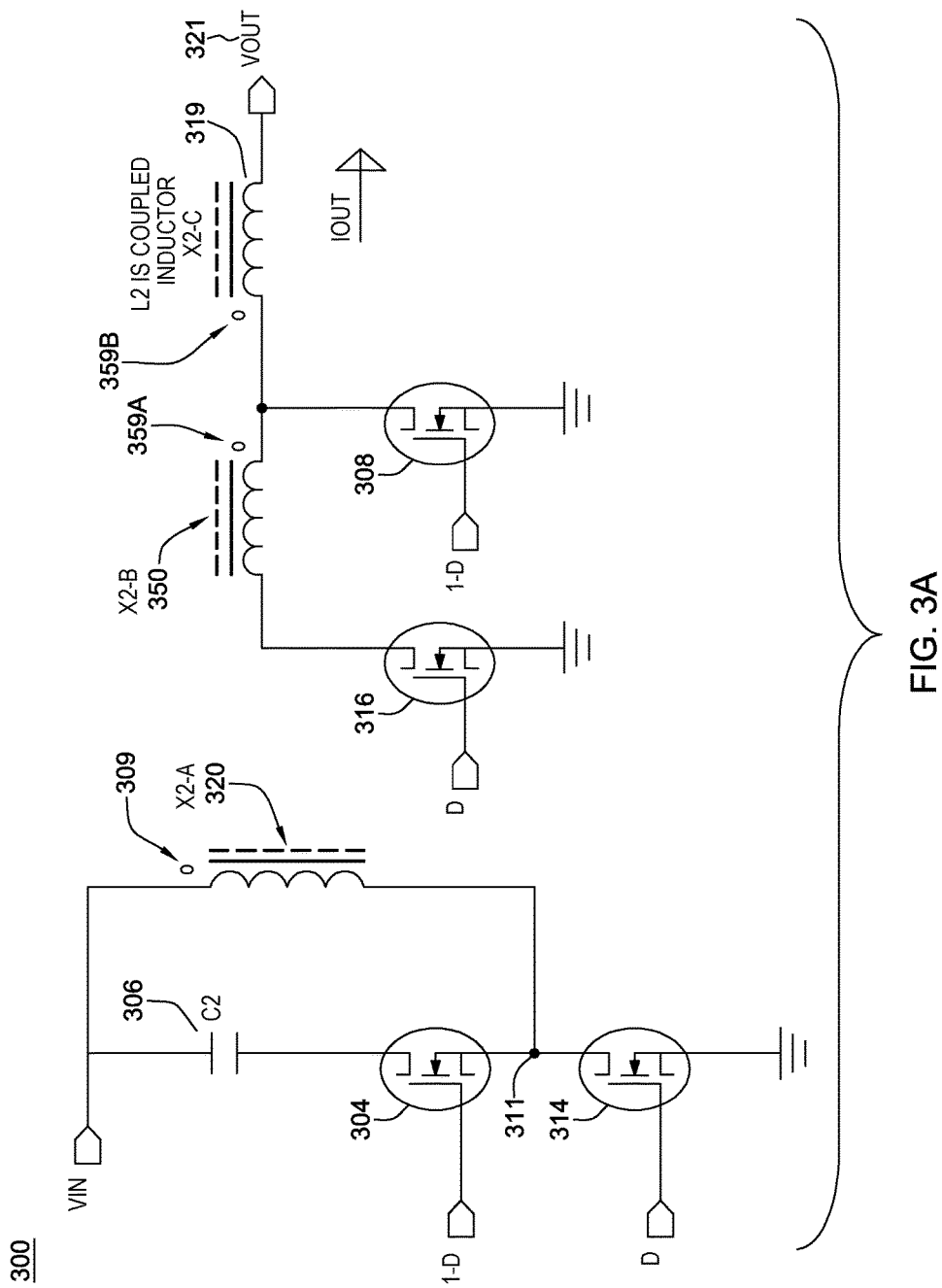
FIG. 3A depicts an electrical schematic of an integrated magnetic active clamp forward converter, with coupled-flux output inductor of the embodiment shown in FIG. 1.

In one embodiment, in view of the equivalent circuit diagram of FIG. 3A, during the main part of the switching cycle when primary main FET 314 and secondary main FET 316 are on, due to the changing flux the transformer leg 110B generates a corresponding electromotive force (EMF) of a first polarity while in the partially-magnetic coupled inductor 110C leg there is generated a corresponding EMF of a second opposite polarity that together is designed to minimize an output current ripple to an output load when delivering power through the primary transformer through the output inductor and into the load. A relative timing of the switches 314, 316 on the primary and secondary sides of the transformer is defined, so as to turn on both the primary main switches and the secondary main switches concurrently, and avoid resonant energy storage in the transformer core.

Given a transformer turns ratio and operating duty cycle for a particular output voltage at a given input voltage, the magnetic reluctances of the transformer, inductor and no-winding legs of the common magnetic core can be designed for minimal output current ripple at the designated output voltage.

In view of the magnetic circuit shown in FIG. 2, and while operating in accordance with the timed activation of switches 104, 108, 114, 116, there is induced a changing magnetic flux in the third leg 110C of the ferrite core which acts in a way similar to a battery, providing an electromotive force (EMF) across the output inductor 319. When the EMF across the secondary winding 350 is at a designed voltage, and the EMF across the inductor 319 provides an opposite voltage, then when the sum of these two voltages in series is equal to the output voltage Vout, then there is no net voltage across output inductor 319, the current through the inductor does not change and there is no output current ripple. If the duty cycle is adjusted so that the average Vout differs from the sum of net induced EMFs, then the current ripple will be nonzero. However, in the configuration shown, the opposite polarities 359A and 359B of transformer secondary EMF and inductor EMF will still reduce the ripple current, compared to a situation with no magnetic coupling.

That is, when the reluctances of each magnetic core leg (flux path) and the duty cycle of the primary and secondary switches which induce changing magnetic flux in each path during portions of the cycle are chosen optimally, then the net induced voltage across the magnetic components in FIG. 3A will match the voltage Vout at the load at every time during the cycle. Under these set of conditions, no voltage is driving the coupled inductor thereby producing zero output current ripple.

As an example, a ratio of reluctance 202 in leg 110A to reluctance 206 in leg 110C may be 3:1. This means that if four (4) volts is created across the transformer secondary winding 350 (e.g., given a 48 V primary source voltage 102 and a 12:1: primary:secondary turns ratio in the transformer), this will be proportional to a changing flux through leg 110B. Given the ratio of reluctances 202 to 206, 3/(3+1) or 3/4 of the changing flux will pass through reluctance 206 or transformer leg 110C. This will be proportional to a 4 V*(3/4)=3 volt EMF across inductor 319, oriented in opposite polarity to the EMF induced across secondary output winding 350. The flux coupling and windings thus create an opposite EMF (e.g., −3V) across the inductor leg which matches external forcing voltages and hence during both sides of the cycle (i.e., main portion and reset portion of the cycle), the output ripple is reduced. When the transformer is off during the reset/circulator portion of the cycle, there is current in the secondary flows through switch 108 and not through the transformer the voltage polarities are reversed across the transformer of, e.g., +1 Volt (EMF) is created across the inductor, thus current is not being accelerated at I_out and thus the ripple is zero.

FIG. 3A particularly depicts an electrical schematic of an integrated magnetic active clamp forward converter 300, with coupled-flux output inductor of the embodiment shown in FIG. 1. A direct current (DC) voltage source Vin (e.g., 48 V) provides voltage supply line connecting one end of the active clamp reset capacitor 306 and further connected to one end of the primary transformer winding structure 320. As shown, the primary transformer winding 320 is of a winding polarity indicated as 309 to generate magnetic flux within the transformer leg of the magnetic core. Due to magnetic reluctance in the remaining magnetic core legs, this magnetic flux is split between these remaining two legs of the magnetic core. The other end of the primary transformer winding 320 connects with one terminal 311 of the primary transformer drive switch 314 that, when activated, provides drive for primary transformer winding 320. The other end of capacitor 306 connects to one terminal of the active clamp reset switch 304, while the other terminal of the active clamp reset switch 304 also connects to terminal 311.

Magnetically coupled secondary transformer winding 350 is wound at the same transformer leg of the magnetic core as the primary transformer winding 320 and includes one end connected to a terminal of the main secondary synchronous rectifier switch 316 while the other end of secondary transformer winding 350 is connected to a terminal of the secondary reset synchronous rectifier switch 314. The other end of the secondary transformer winding 350 is further connected to the integrated output inductor 319 having an inductor winding wound at on different transformer leg of the magnetic core that provides an output voltage 321 across the output capacitor and a connected load (not shown).

As shown in FIG. 3A, the secondary transformer winding 350 is of a winding polarity indicated as 359A to generate an internally induced voltage or EMF across the transformer winding 350 that is positive at dot 359A relative to the opposite end of winding 350, for a positive voltage of polarity 309 across primary winding 320. On the other hand, the integrated (coupled) output inductor 319 is of a winding polarity indicated at 359B which generates a positive voltage at dot 359B relative to the opposite end of inductor winding 319. These opposing winding polarities 359A, 359B together with the relative EMF magnitudes determined by the reluctance ratios from FIG. 2, reduce output current ripple to virtually zero at a particular optimal output voltage 321.

As mentioned, the designed ratio of ferrite core leg reluctances will result in a nearly zero output current ripple at one particular optimal output voltage. For a given input voltage and designed transformer turns ratio, the operational duty cycle of a periodically switched input voltage signal applied across the primary winding structure can be adjusted so as to obtain a wide range of output voltages. If the duty cycle is adjusted to provide the optimal output voltage that was determined by the designed reluctances, then the current ripple through the inductor will approach zero. For a duty cycle and output voltage range around this optimal point the output current ripple will remain low, lower than what the ripple would have been for the same value of output inductance in the case without magnetic coupling between transformer and inductor as in FIG. 3B. In one embodiment, a programmable digital pulse signal generator (not shown) generates control activation signals for input to the gate terminal of the main primary drive switch 314 at a duty cycle "D" for controlling timed activation of the gate of main primary switch 314, i.e., where duty refers to the ON-time the Vin input voltage is applied across the primary input winding. This same digital control activation signal "D" also simultaneously controls timed activation (\i.e., turning on) of the gate of secondary side main switch 316.

FIG. 5A shows an example pulsed digital gate control signal 501 of duty cycle "D" that may be simultaneously applied to the inputs of main primary switch 314 and secondary synchronous rectifier or secondary main switch 316.

Similarly, the programmable digital pulse signal generator (not shown) generates control activation signals for input to the gate terminal of the active clamp reset switch 304 at a complementary (180° out of phase) duty cycle "1-D" for controlling timed activation of the gate of active clamp reset switch 304. This same digital control activation signal also simultaneously controls timed activation (i.e., turning on) of the gate of secondary side circulator switch 308.

FIG. 5B shows an example pulsed digital gate control signal 502 of the complementary duty cycle "1-D" for simultaneously controlling timed activation of the gate of the active clamp reset switch 304 and also controlling timed activation of the gate of the secondary side circulator switch 308.

In one non-limiting implementation, a switching frequency of the pulsed gate activation signals D and 1-D is about 350 kHz, however switching frequency may range from between 100 kHz-400 KHz. To further compact the resulting DC-DC converter design, this operating switching frequency range from between 10 MHz-100 MHz or higher. The duty cycle D may range from between 10%-50% however, the duty cycle range may be increased between 1%-99% dependent upon the switching capabilities of MOSFET transistor switches 304, 308, 314, 316. The resulting magnetic coupling is such that a reversal is achieved, i.e., the polarity of current ripple reverses as duty cycle is adjusted, i.e., the current ripple approaches zero at a designed optimal output voltage. In one embodiment, the chosen ON/OFF times of the gate activation signal D and 1-D are such so as to achieve a 1.0+/−0.1 Volt output at a connected load. Given an example primary winding/secondary winding ratio Ns:Np of 1:12, with a 48 Vin input, the voltage at the secondary winding output may be about 4 volts (e.g., ¹⁄₁₂ of 48 volts input). Thus, in one embodiment, given a 25% duty cycle, i.e., the ON time of pulsed signal D may be ¼ of the period length of signal D which reduces the output voltage of the coupled inductor to about 1.0 volt which is the voltage at the output capacitor 112 available to drive an attached load.

In steady state, for a repeating pattern of the timing of the gate activations of primary/main secondary switches 314, 316 at duty cycle D, and of the gate activations of reset/circulator switches 304, 308 at duty cycle 1-D, a voltage will build up across reset capacitor 306 that will bring the primary current back down by the end of the cycle to the starting value of the primary current at the beginning of the cycle. The section of primary current that is the transformer magnetizing current will return to zero at the start of every cycle. No net magnetic flux will build up (i.e., residual flux not stored). When energy passes through the transformer during the part of the cycle where the primary main FET 314 and secondary main FET 316 are on, the flux induced by this "load" component of the current through primary winding 309 will exactly cancel with the flux induced by this "load" component of the current through the secondary winding 350. The amount of energy transferred from input to load is not dependent on resonant energy storage in the ferrite core, thereby allowing for a more compact ferrite design.

Figure 3B:
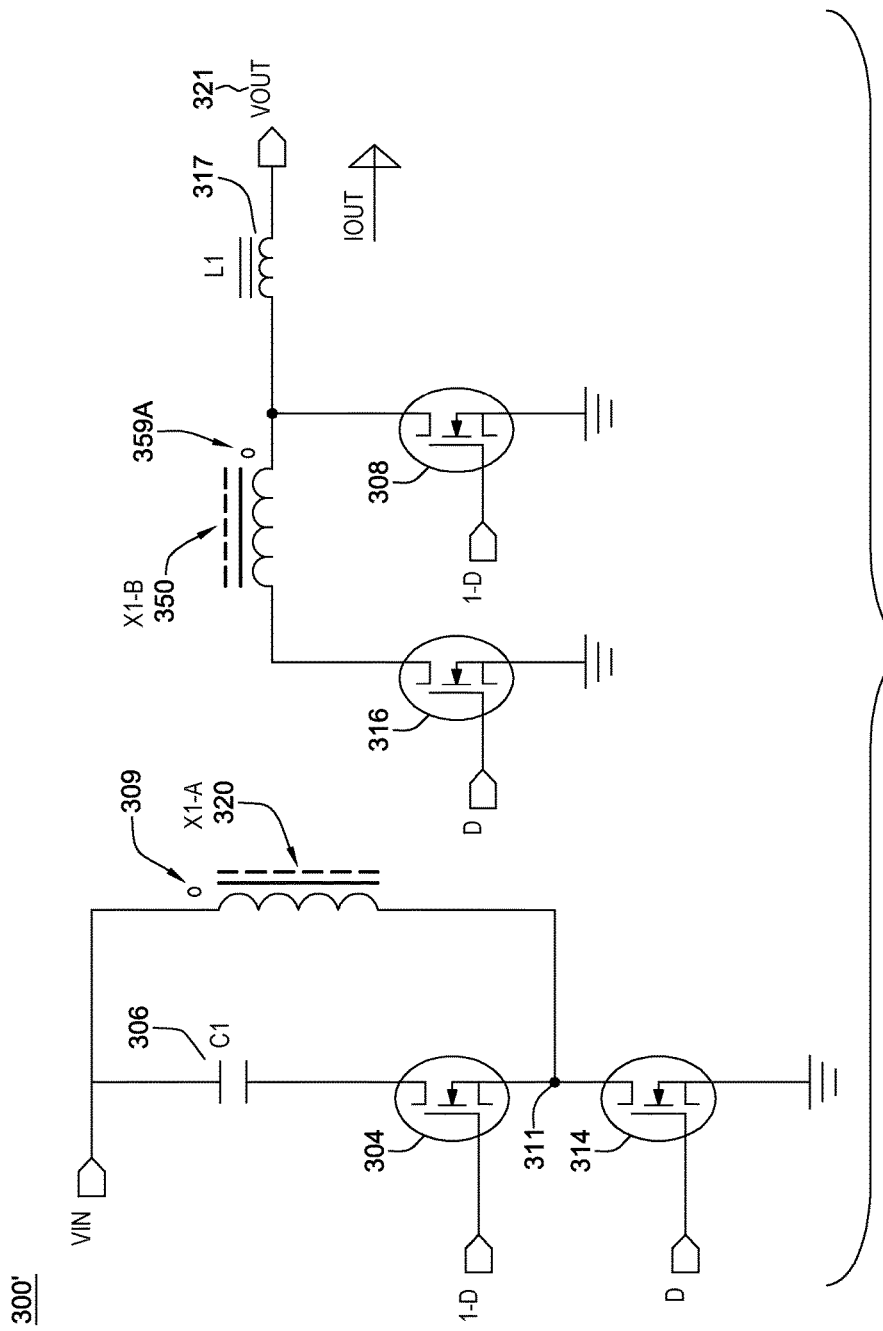
FIG. 3B depicts an equivalent electrical circuit schematic of a further embodiment of an active clamp forward DC-DC converter 300' having a separate, non-coupled-flux (discrete) output inductor in one embodiment.

FIG. 3B depicts a schematic of a further embodiment of an active clamp forward DC-DC converter 300' which differs from converter 300 of FIG. 3A in that the output inductor is a separate (discrete) and non-magnetically-coupled output inductor 317. The timing of gate activation signals of switches 304, 308, 314, 316 and operation of both the converter circuits 300 (of FIG. 3A) and 300' (of FIG. 3B) to achieve a given average output voltage are the same. However, the output current ripple will not be zero for any finite load impedance and for any nonzero average load current Iout. With no internally induced EMF across output inductor 317, Iout will increase during the main part of the cycle when main FETs 314 and 316 are on and when the induced voltage across the transformer secondary 350 is larger than the average output voltage Vout. In this case there will be a positive external voltage applied across output inductor 317, and the output current Iout will increase. Similarly during the circulator part of the cycle there will be no internally induced EMF across output inductor 317, the output inductor will have a negative external voltage applied across it, and the output current Iout will decrease.

Returning to FIG. 1, in steady state operation, the output capacitor 112 will be at a voltage to balance the volt-seconds across the primary transformer winding 120. The output voltage for the power converter circuit 100 is Vout=Vin*Ns/Np*duty, where Ns is the number of secondary windings configured about second leg of magnetic core 110, Np is the number of primary windings around this same leg and duty is the duty cycle.

To achieve an average of zero volts across the primary winding, the reset capacitor 106 voltage will be:

$$Vin*duty=Vcap*(1-duty)$$

$$Vcap=(Vin*duty)/(1-duty)$$

where duty "D" refers to the ON-time the input voltage is applied across the primary input winding. The secondary switches 116, 108 rectify the output voltage winding. During an "ON" time when Vin*Ns/Np is applied across the secondary, e.g., during on-time of duty D applied to primary switch 114, the switch 116 is simultaneously turned on and the switch 108 is turned off. In this part of the cycle, transformer winding current flows to a connected load as shown in FIG. 1. During an off-time of the D gate control signal 501 of FIG. 5A which corresponds to the "on" time of the 1-D gate control signal shown in FIG. 5B, voltage across the capacitor 106 is applied across the primary winding with switch 104 turned on, the switch 116 being turned off, and the switch 108 being turned on.

The output voltage is the time average of the voltage applied across the inductor winding.

At operating points where the current ripple from the DC-DC converter's output inductor is not zero, the output capacitor 112 of FIG. 1 filters the inductor current to achieve a more steady DC current supplied to the load by the low pass nature of an LC filter.

The magnetic coupling between the transformer core secondary leg and the inductor leg functions to induce an internal EMF across the inductor which is in opposite polarity to the voltage applied externally to the output inductor 319 by the transformer secondary winding 350. This magnetic coupling therefore reduces the net voltage difference which is inducing a changing current through the inductor, thereby reducing the output current ripple.

In one embodiment, the power converter circuit of FIGS. 1 and 3A may be adjusted, in order to set the output voltage at which the output current ripple will be minimized. In such an embodiment, the configuring of magnetic reluctances in each leg, e.g., designing the magnetic core leg areas and adjusting the gap size in each magnetic core leg 110A-110C shown in FIG. 1 to control percentages of the flux through each leg, will adjust the output voltage at which output current ripple is ideally zero. Then, by adjusting the duty cycle with which the FET gates are switched on and off, the output voltage point may moved up or down around this optimal point. The ripple will increase as the output voltage set point becomes larger or smaller than the optimal, minimum ripple output voltage. However, the output current ripple will remain smaller than the case where there is no magnetic coupling between transformer and inductor.

FIG. 6 is a timing diagram 600 depicting an example operation of the DC-DC power converter circuit of FIGS. 1-3A, showing coupled inductor output current 602 plotted against the switched primary reset voltage 605 across the primary main FET 114 or 314. This is the voltage at wire 115, the voltage applied to the primary transformer winding terminal out of which current I_primary exits. As shown in FIG. 6, during successive on-time portions 610A, 610B, 610C, etc. of the switching duty cycle D in which primary transformer switch is on, inductor current 602 flows out of the transformer secondary, through the inductor and into a connected load, and the inductor current is nearly flat or slowly decreasing.

During successive timing portions 612A, 612B, etc. of the switching duty cycle 1-D in which the active reset capacitor provides voltage across the primary winding and the main transformer primary and secondary switches are off, inductor current flows from ground through the inductor and into the load. Instead of decreasing inductor current, the polarity of the ripple current 602 inverts, i.e., is shown with a slight rise 615. Thus, given the input voltage at the secondary winding, and due to the flux-induced voltage around the loop there is generated an opposite voltage, i.e., due to the inductor induced voltage. Under ideal conditions of timing and magnetic reluctance, the output current ripple of inductor current 602 would be zero. However, in the example as shown, the ripple current exhibits a small nonzero magnitude with a polarity reversed compared to the polarity that would occur with zero magnetic coupling. The output current ripple is much smaller than in the zero magnetic coupling case. That is, in one embodiment, a polarity of output current ripple reverses as duty cycle is adjusted with the output current ripple approaching zero at a designed output voltage.

Figure 4:
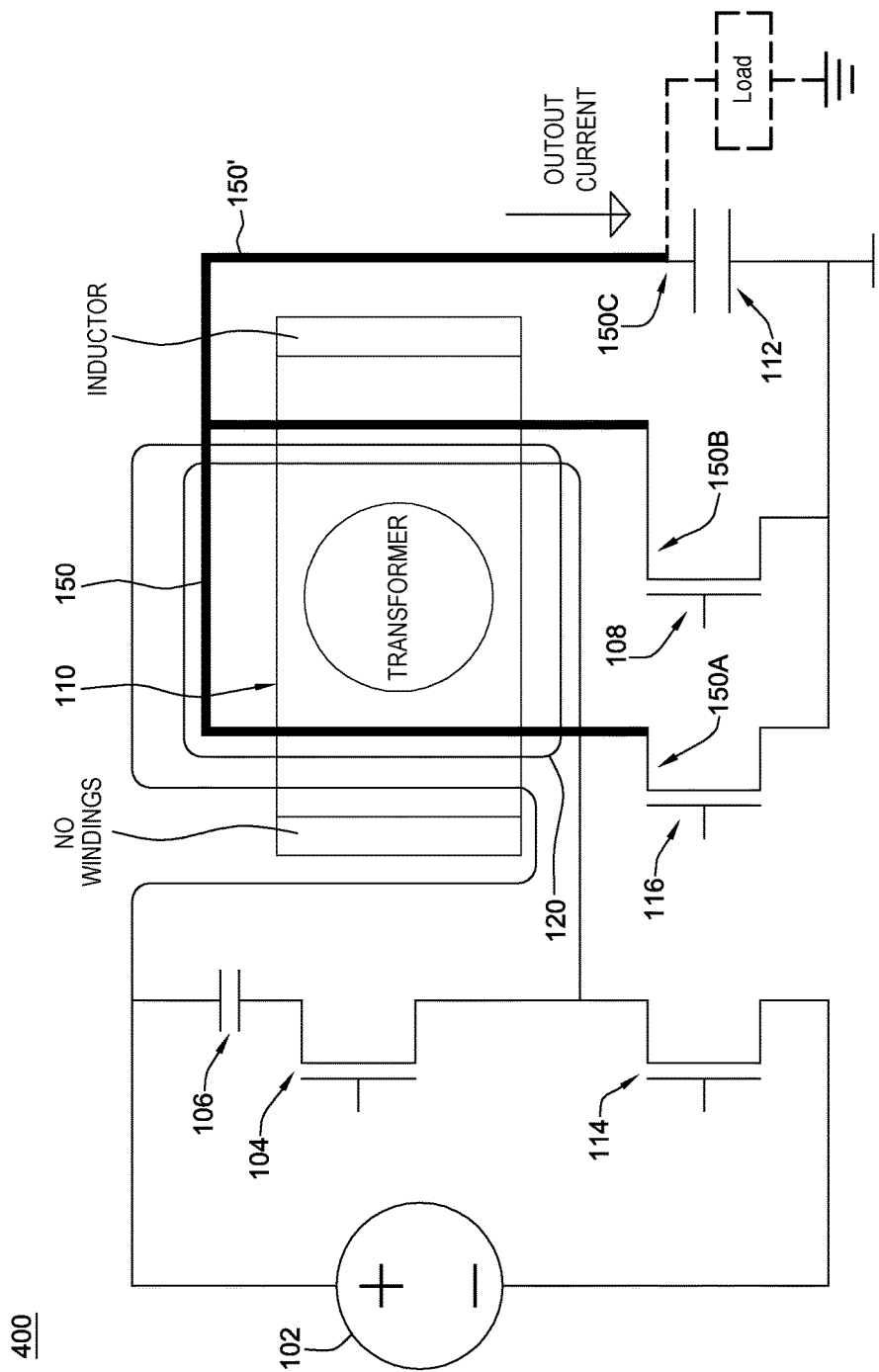
FIG. 4 is a top down view of the three-post magnetic core shown in FIG. 1, showing the same transformer and inductor windings and the same active forward converter components and electrical circuits shown in FIG. 1.

FIG. 4 is a top down view showing how a three-post magnetic core, four FETs and a reset capacitor of the integration of the power converter circuit 400 may be arranged on a printed circuit board. As shown in the view of FIG. 4, an integrated magnetic forward converter includes: the primary voltage source 102, the active clamp reset switch 104, the active clamp reset capacitor 106, the main secondary synchronous rectifier switch 108, the magnetic core 110, the output capacitor 112 is used for filtering the output current ripple into a dc voltage, the main primary switch 114 and the secondary reset synchronous rectifier 116. The primary transformer winding 120 and the secondary winding 150 are shown and can be implemented in planar copper structures formed from the layers of a printed circuit board. In this embodiment, the secondary transformer winding structure 150 and inductor winding structure 150' are formed in a planar orientation on copper layers of a planar printed circuit board. Further, although not shown, one or more discrete conducting elements may be placed in parallel or in series with current paths in the circuit board to reduce electrical conduction losses.

Figures 7A, 7B:
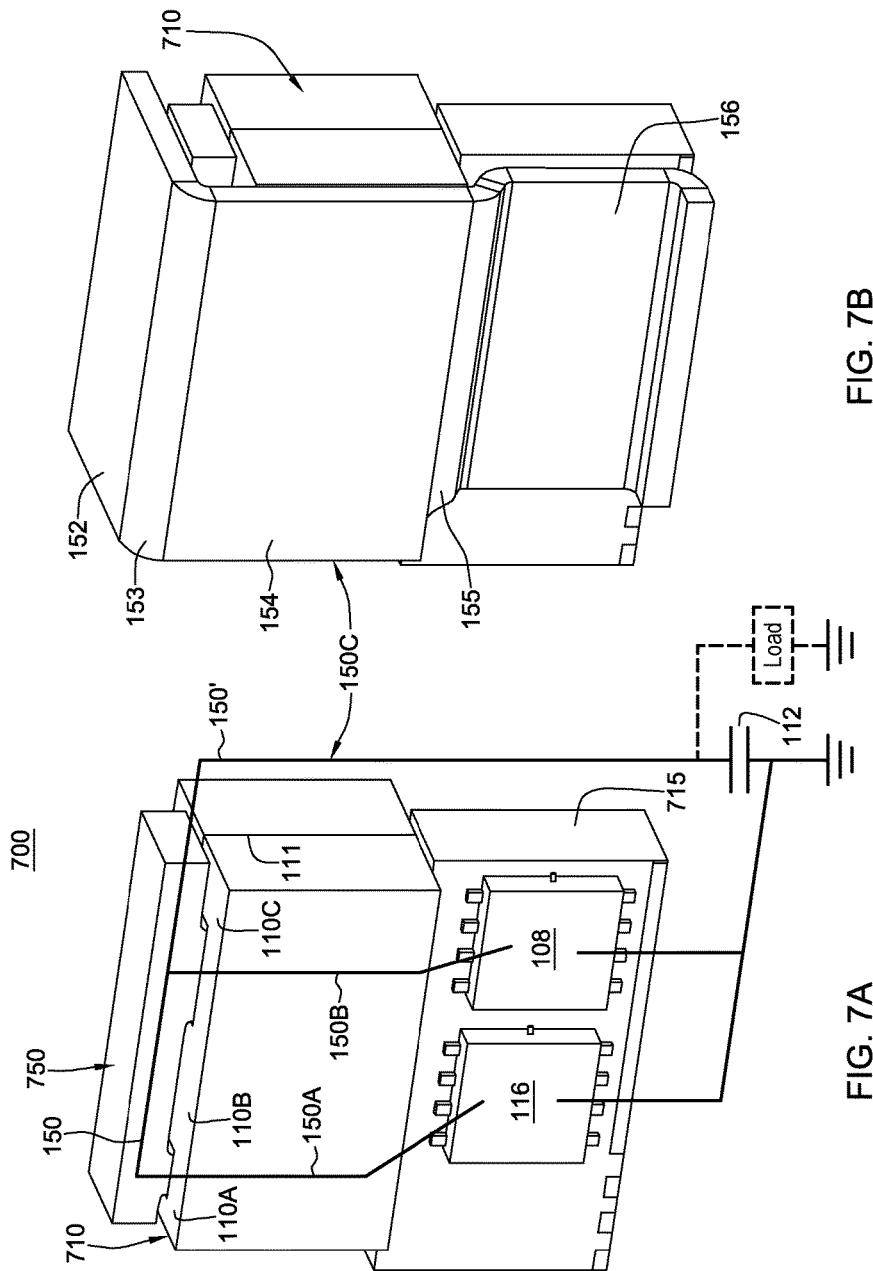
FIG. 7A shows a 3-dimensional view of an embodiment of an electrical circuit superimposed on the physical structure of the integrated magnetic ferrite core providing partial magnetic coupling between a transformer and inductor legs (posts) magnetic circuit structure of a DC-DC power converter circuit shown in FIG. 1.
FIG. 7B shows the physical implementation of a mounted electrical circuit low resistance output wire for connection to the load of the electrical circuit shown in FIG. 7A.

FIGS. 7A and 7B show respective 3-dimensional views of an embodiment of a physical layout and structure of the DC-DC power converter circuit 700 corresponding to the integrated magnetic ferrite core 710 providing partial magnetic coupling between a transformer post and an inductor leg (post) 110B, 110C respectively as shown. As mentioned, the proper transformer secondary winding vs. inductor winding polarities described herein above functioning to reduce the output current ripple, afford a significant reduction in inductor value which is possible due to the magnetic coupling, and correct winding polarity. In FIG. 7A, this amounts to a space savings on a printed circuit board 715 due to the common connection 150B of transformer secondary winding 150 and inductor winding 150' shown superimposed in FIG. 7A around the ferrite core structure 710 (as described herein with respect to FIG. 1 as a two piece structure with gap 111) for connection to secondary circulator MOSFET switch 108. As shown in FIG. 7A, conductive wires 150 and 150' are electrically connected on a portion of the printed circuit board (PCB) through common wire connection 150B to a terminal of the fourth MOSFET device 108 functioning as a secondary side circulator switch. This combined connection is embodied as a common section of a printed circuit board trace passing between the transformer post and inductor post of the common magnetic structure in a printed circuit board. As no large inductor is needed to achieve low current ripple, the transformer and ferrite volume may be shrunk, and given the implementation as a planar magnetic structure on a printed circuit board (PCB) 715, inductor winding 150' may be connected to output load point (wire) 150C as physically implemented as a single low resistance, low inductance wire connected external to the circuit board, as shown in FIG. 7B. In FIG. 7B, this low resistance output wire structure 150C includes a wire contact portion 152 extending from a conductive winding contact exposed at a peripheral end face 750 of the PCB above and from the top side of the transformer ferrite magnetic core 710 and includes curved portion 153 and further low resistance portion 154 that extends over a portion of the magnetic core 710. Wire 150C further includes curved portion 155 that curves back inwards towards the core, and includes further includes low resistance output contact portion 156 extending over the two formed MOSFET devices 116, 108 to eventually connect to the load. In one embodiment, a non-electrically conductive layer of material may separate the back surface of the wire portion 156 to avoid contacting the surfaces of devices 116, 108. In an embodiment, the portion 156 may provide a thermal contact to contact the surfaces of devices 116, 108 and draw heat away from the devices 116, 108. In one embodiment, this conductor 150C is formed as a common conductive wire trace having a "wide" top surface metal foot providing the low output resistance connector carrying output current to the load in a compact low resistance structure that enables further shrinking of volume of the magnetic power converter circuitry. Wire contact portion 152-156 may be connected the PEF according to processes as described in co-pending commonly-owned U.S. patent application Ser. No. 15/808,786 incorporated by reference herein.

The DC-DC power converter of FIGS. 1-4 includes an integrated transformer and coupled inductor with a mutual inductance and winding polarity such that the coupled transformer and inductor magnetic fields reduce the ripple current in the converter's output inductor. This effectively amplifies the inductor value as far as current ripple is concerned (but not as far as step response is concerned), so that only a small inductance value is required for output filtering. Reducing the designed inductance value allows for further reduction in the converter's size and volume—decreasing its form factor. The net reduction in volume allows this transformer-based DC-DC converter with a high input voltage to be competitive in space efficiency with traditional buck converters that have no transformer but can only operate from lower input voltages.

In addition, with the transformer switch timing polarities defined such that both primary and secondary main switches are simultaneously on, there is no significant energy storage in the transformer ferrite, allowing a third space savings from a smaller ferrite volume.

It is understood that, in additional embodiments not shown, the magnetic core 110 may be provided having additional ferrite magnetic core legs with additional circuit connections and winding structures for functioning as additional primary transformers, secondary transformers and coupled output inductors.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A magnetic circuit for a DC to DC power converter device comprising:

a common magnetic core structure providing a transformer device having a primary winding and secondary winding structures integrated into a first leg structure of said magnetic core, and an output inductor device having an output inductor winding structure integrated into a second leg structure of said magnetic core, the inductor winding structure for delivering output current to a load when a periodically switched input voltage is applied across the primary winding structure;

a secondary main switch device operatively connected to said secondary winding structure and timed to prevent a current reversal through the secondary winding structure, wherein said secondary winding structure is of a first winding polarity and said output inductor winding structure is of a second winding polarity, said first and second winding polarities providing oppositely oriented polarities of electromotive force (EMF) to substantially reduce an output current ripple to an output load when delivering power through the transformer, through the output inductor and into the output load, wherein said common magnetic core further includes a third leg structure allowing a magnetic flux created through the first leg structure to pass partially through the second leg structure and partially through the third leg structure, thereby providing a partially-coupled magnetic flux path between the first transformer magnetic core leg structure and the second leg structure, wherein a magnitude of the partial magnetic coupling determines the output voltage at which the output current ripple is minimized.

2. The magnetic circuit of claim 1, wherein said ferrite volume of said output inductor core leg structure is substantially reduced due to a reduced said output inductor value resulting in a reduced transformer magnetic core structure volume.

3. The magnetic circuit of claim 1, wherein said reduced output inductor value permits significant decrease in an output step response time to changes in an output load.

4. The magnetic circuit of claim 1, wherein the transformer primary windings, the secondary transformer windings and the output inductor winding structures are formed as conducting layers of a planar printed circuit board.

5. The magnetic circuit of claim 4, wherein said transformer secondary winding structure and said output inductor winding structure are combined to connect with a secondary circulator switch device, said combined connection embodied as a common section of printed circuit board trace passing between the transformer leg and inductor leg of the common magnetic core structure.

6. The magnetic circuit of claim 4, further comprising a physical low resistance conductor connection from said output inductor winding structure to a load point external to the circuit board.

7. The magnetic circuit of claim 1, wherein the input voltage is applied across the primary winding structure through a first primary main switch device during a fraction of a switch timing cycle, and wherein a second secondary main switch device is connected in series with the transformer secondary winding structure, wherein the timing of the primary main and secondary main switch devices is of a duty cycle designed to switch both primary main and secondary main switch devices concurrently on, and wherein said output inductor is further connected in series with said transformer secondary winding structure such that power is delivered through the transformer to said series-connected output inductor and into an output load during the fraction of the timing cycle when both the primary main and secondary main switches are on, thereby eliminating any resonant energy storage in the transformer leg of the ferrite magnetic core.

8. The magnetic circuit of claim 7, wherein said eliminating any resonant energy storage in the transformer first leg of the ferrite magnetic core enables the common magnetic core volume to be substantially decreased.

9. The magnetic circuit of claim 7, wherein a ferrite volume of said output inductor core leg structure is substantially reduced due to a reduced said output inductor value resulting in a reduced transformer magnetic core structure volume.

10. The magnetic circuit of claim 7, wherein said reduced output inductor value permits a significant decrease in an output step response time to changes in an output load.

11. The magnetic circuit of claim 7, wherein the transformer primary windings, the secondary transformer windings and the output inductor winding structures are formed as conducting layers of a planar printed circuit board.

12. The magnetic circuit of claim 11, wherein said transformer secondary winding structure and said output inductor winding structure are combined to connect with a secondary circulator switch device, said combined connection embodied as a common section of printed circuit board trace passing between the transformer leg and inductor leg of the common magnetic core structure.

13. The magnetic circuit of claim 11, further comprising a physical low resistance conductor connection from said output inductor winding structure to a load point external to the circuit board.

14. A method of reducing output current ripple of a magnetic circuit for a DC to DC power converter, the method comprising:
   providing a transformer device having a primary winding and secondary winding structures integrated into a first leg structure of a magnetic core,
   providing an output inductor device having an output inductor winding structure integrated into a second leg structure of said magnetic core, the inductor winding structure for delivering output current to a load;
   applying a periodically switched input voltage across the primary winding structure to generate said output current;
   timing a switching of a secondary main switch device operatively connected to said secondary winding structure to prevent a current reversal through the secondary winding structure,
   wherein said secondary winding structure is of a first winding polarity and said output inductor winding structure is of a second winding polarity, said first and second winding polarities providing oppositely oriented polarities of electromotive force (EMF) to substantially reduce an output current ripple to an output load when delivering power through the transformer device through the output inductor and into the output load, and
   providing a partially-coupled magnetic flux path between the first transformer magnetic core leg structure and the second leg structure by passing a magnetic flux created through the first leg structure partially through the second leg structure and partially through a third leg structure of said common magnetic core, wherein a magnitude of the partial magnetic coupling determines an output voltage at which the output current ripple is minimized.

15. The method of claim 14, wherein a ferrite volume of said output inductor core leg structure is substantially reduced due to a reduced said output inductor value to result in a reduced transformer magnetic core structure volume.

16. The method of claim 14, further comprising:
   decreasing in an output step response time to changes in an output load based on said reduced output inductor value.

17. The method of claim 14, forming the transformer primary windings, the secondary transformer windings and the output inductor winding structures as conducting layers of a planar printed circuit board.

18. The method of claim 17, further comprising:
   combining said transformer secondary winding structure and said output inductor winding structure to connect with a secondary circulator switch device, said combined connection embodied as a common section of printed circuit board trace passing between the transformer leg and inductor leg of the common magnetic core structure.

19. The method of claim 14, further comprising:
   applying the input voltage across the primary winding structure through a first primary main switch device during a fraction of a switch timing cycle,
   connecting a second secondary main switch device in series with the transformer secondary winding structure, wherein the timing of the primary main and secondary main switch devices is of a duty cycle designed to switch both primary main and secondary main switch devices concurrently on, and
   further connecting said output inductor in series with said transformer secondary winding structure to deliver power through the transformer to said series-connected output inductor and into an output load during the fraction of the timing cycle when both the primary main and secondary main switches are on, thereby eliminating any resonant energy storage in the transformer leg of the magnetic core structure.

20. The method of claim 19, further comprising:

eliminating any resonant energy storage in the transformer first leg of the magnetic core so substantially decrease the common magnetic core volume.

* * * * *